(12) United States Patent
Ito et al.

(10) Patent No.: US 7,216,538 B2
(45) Date of Patent: May 15, 2007

(54) VIBRATORY ANGULAR RATE SENSOR

(75) Inventors: Hajime Ito, Ichinomiya (JP); Kenichi Ao, Tokai (JP)

(73) Assignee: Denso Corporation, Kariya (JP)

( * ) Notice: Subject to any disclaimer, the term of this patent is extended or adjusted under 35 U.S.C. 154(b) by 114 days.

(21) Appl. No.: 11/188,880

(22) Filed: Jul. 26, 2005

(65) Prior Publication Data
US 2006/0027019 A1 Feb. 9, 2006

(30) Foreign Application Priority Data
Aug. 5, 2004 (JP) ............................. 2004-229629

(51) Int. Cl.
*G01P 9/04* (2006.01)
(52) U.S. Cl. .................................. 73/504.12
(58) Field of Classification Search ............. 73/504.12, 73/504.14
See application file for complete search history.

(56) References Cited

U.S. PATENT DOCUMENTS

| 5,412,204 A | * | 5/1995 | Nakamura ................ 73/504.12 |
| 5,806,364 A |   | 9/1998 | Kato et al. ................ 73/504.12 |

FOREIGN PATENT DOCUMENTS

| JP | 9-170927 | 6/1997 |
| JP | 10-93430 | 4/1998 |
| JP | 2002-139322 | 5/2002 |

\* cited by examiner

*Primary Examiner*—John E. Chapman
(74) *Attorney, Agent, or Firm*—Posz Law Group, PLC (57) ABSTRACT

A vibratory angular rate sensor comprises a vibrator having a vibrating element arranged to oscillate along a first direction, the element being arranged to further oscillate along a second direction perpendicular to the first direction when subjected to angular rate about a third direction perpendicular to the first and second directions. The vibrating element is caused to oscillate at a predetermined frequency along the first direction. An oscillation detector generates a voltage representing oscillations of the vibrating element along the second direction. A first synchronous detector synchronously detects a primary frequency component of the generated voltage using clock pulses of the predetermined frequency to produce an output signal. A second synchronous detector synchronously detects an odd-numbered harmonic of the generated voltage using clock pulses of the odd-numbered harmonic frequency. A residual odd-numbered harmonic component contained in the output signal of the first synchronous detector is cancelled with the detected odd-numbered harmonic.

31 Claims, 10 Drawing Sheets

VIBRATORY ANGULAR RATE SENSOR

CROSS REFERENCE TO RELATED APPLICATION

This application is related to Japanese Patent Application No. 2004-229629 filed on Aug. 5, 2004, the contents of which are hereby incorporated by reference.

BACKGROUND OF THE INVENTION

1. Field of the Invention

The present invention relates to a vibratory angular rate sensor.

2. Description of the Related Art

Vibratory angular rate sensors (gyrosensors) are recently in much demand for application to vehicle control and navigation because of their lower cost and smaller mass in comparison with other types of angular rate sensor. As described in Japanese Patent Publication 2002-139322 and U.S. Pat. No. 5,806,364, the vibratory angular rate sensor utilizes the Coriolis effect on a vibrating element that oscillates along a first direction by measuring its oscillation along a second direction perpendicular to the first direction. In the known vibratory angular rate sensor, the angular rate is detected in the form of a modulation of a sinusoidal waveform of reference frequency with the amplitude of the oscillation along the second direction. However, frequency components other than the fundamental frequency are generated in vehicular environment due to a number of factors. To remove the undesired frequency components, the synchronous detection technique is used to extract the fundamental frequency component from the amplitude-modulated signal using clock pulses synchronized to the fundamental frequency. However, the current vibratory angular rate sensor is still not satisfactory for vehicular application because the zero-point level of the detected angular rate fluctuates. Further, the detected angular rate suffers from phase instability.

Therefore, a need does exist to provide a vibratory angular rate sensor capable of detecting angular rate without zero-point fluctuation and phase instability.

SUMMARY OF THE INVENTION

The vibrator of the angular rate sensor has a vibrating element connected by resilient coupling members to its stationary frame. The present invention is based on a finding that the zero-point fluctuation and phase instability are caused by the generation of harmonic components due to a number of resonance modes associated with the resilient coupling members and the frame structure. A mathematical analysis indicates that, although the even-numbered harmonics can be cancelled in the process of synchronous detection, the odd-numbered harmonics cannot completely be cancelled. One solution would be to use a pre-filter for removing the odd-numbered harmonics before synchronous detection is performed. However, the frequency of the third harmonic is so close to the fundamental frequency that it is difficult to completely remove the undesired component without adversely affecting the zero-point level of the desired component, while at the same time eliminating the phase instability problem.

It is therefore an object of the present invention to provide a vibratory angular rate sensor capable of detecting angular rate without zero-point fluctuation and phase instability.

According to a first aspect of the present invention, there is provided a vibratory angular rate sensor comprising a vibrator having a vibrating element arranged to oscillate along a first direction, the element being arranged to further oscillate along a second direction perpendicular to the first direction when subjected to angular rate about a third direction perpendicular to the first and second directions, a driving circuit for causing the vibrator to oscillate the vibrating element at a predetermined frequency along the first direction, an oscillation detector for detecting oscillations of the vibrating element along the second direction and generating a voltage representative of the detected oscillations, generating a voltage representative of oscillations of the vibrating element along the second direction, a first synchronous detector for synchronously detecting a primary frequency component of the generated voltage using clock pulses of the predetermined frequency and producing an output signal containing the detected primary frequency component, and a second synchronous detector for synchronously detecting an odd-numbered harmonic of the generated voltage using clock pulses of the frequency of the odd-numbered harmonic. A harmonic canceller is provided for canceling a residual odd-numbered harmonic component contained in the output signal of the first synchronous detector with the odd-numbered harmonic detected by the second synchronous detector.

According to a second aspect, the present invention provides a method of detecting angular rate, comprising the steps of (a) oscillating a vibrating element along a first direction at a predetermined frequency and allowing the vibrating element to oscillate along a second direction perpendicular to the first direction when the vibrating element is subjected to angular rate about a third direction perpendicular to the first and second directions, (b) generating a voltage representative of oscillations of the vibrating element along the second direction, (c) synchronously detecting a primary frequency component of the generated voltage using clock pulses of the predetermined frequency and producing an output signal containing the detected primary frequency component, (d) synchronously detecting an odd-numbered harmonic of the generated voltage using clock pulses of the frequency of the odd-numbered harmonic, and (e) canceling a residual odd-numbered harmonic component contained in the output signal of the first synchronous detector with the odd-numbered harmonic detected by the second synchronous detector.

The mathematical analysis further indicates that the residual ratio of a odd-numbered harmonic is uniquely determined by its order. In order to completely remove the undesired odd-numbered harmonic, it is preferable to reduce the detected odd-numbered harmonic by a factor corresponding to its order.

Since the output of the first (primary) synchronous detector is synchronized in frequency to the frequency at which the vibrating element is caused to oscillate by the driving circuit, a clock pulse generator is advantageously used for generating clock pulses from the driving circuit for operating the primary synchronous detector and a frequency multiplier is advantageously used for generating clock pulses for operating the second synchronous detector by multiplying the fundamental frequency by a factor corresponding to the odd-numbered harmonic.

To simplify configuration, the second synchronous detector is configured to operate by using clock pulses of waveform inverted with respect to the clock pulses of the predetermined (fundamental) frequency. In this case, the harmonic canceller includes an adder for summing the odd-numbered harmonic detected by the second synchronous detector with the output signal of the primary synchronous detector. The harmonic canceller comprises a low-pass filter having a cut-off frequency lower than the predetermined frequency. Circuit simplification can be achieved by configuring this low-pass filter into an active filter with a dual function of the adder.

Since the residual ratio of odd-numbered harmonics becomes smaller as their order increases, it is not necessary to provide synchronous detectors for removing odd-numbered harmonics of the order higher than some critical value. For practical purposes, it is sufficient to remove the odd-numbered harmonic whose order is equal to or lower than ninth. In most applications, it is sufficient to provide one synchronous detector that uses clock pulses of the third harmonic frequency.

In applications where precision is important, a plurality of second synchronous detectors may be provided respectively for synchronously detecting odd-numbered harmonics of different orders using clock pulses of the odd-numbered harmonic frequencies of the different orders. In this case, a frequency multiplier can be used for multiplying the predetermined frequency by a common multiple of the odd-numbered harmonic frequencies of the different orders and a plurality of frequency dividers may be used for dividing the multiplied frequency by the orders of the odd-numbered harmonics.

BRIEF DESCRIPTION OF THE DRAWINGS

The present invention will be described in detail with reference to the following drawings, in which.

DETAILED DESCRIPTION

Figure 1:
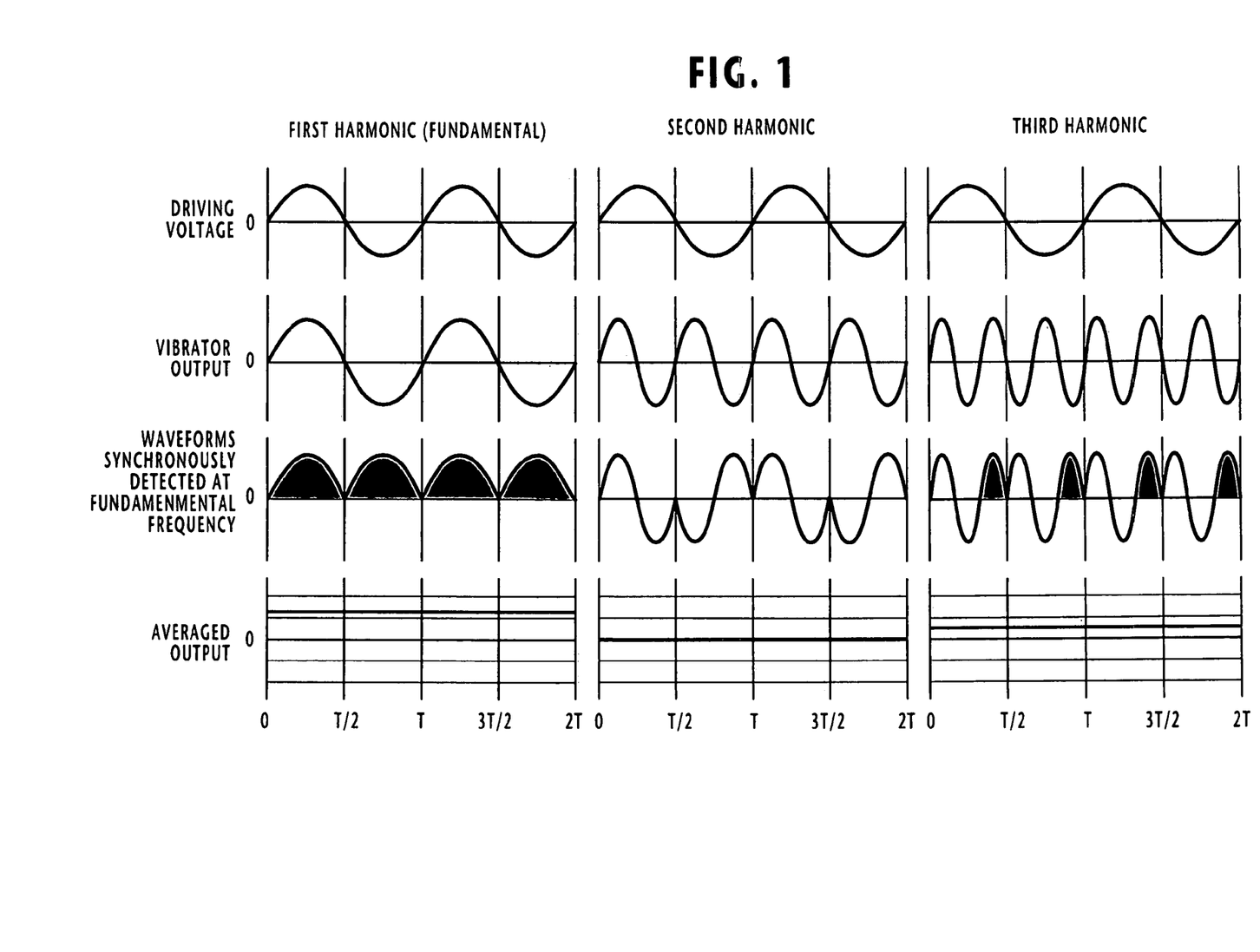
FIG. 1 is an illustration of waveforms that result from when first (fundamental), second and third harmonics are synchronously detected at the frequency of the first harmonic and then averaged.

FIG. 1 illustrates the output waveforms that develop in a vibrator in response to a driving voltage of sinusoidal waveform. Due to the nonlinear characteristics of the vibrator, the output of the vibrator may contain second and third harmonics as well as first harmonic (fundamental frequency). When the output of the vibrator is synchronously detected using clock pulses of fundamental frequency (1/T), different waveforms result depending on the harmonics it contains. If the vibrator output contains only the first harmonic, all the negative half-cycle components are inverted as shown at left of the figure and a useful DC output is obtained by averaging all positive half-cycles. If the vibrator output contains the second harmonic, the full-cycle components of odd-numbered periods (i.e., T/2 to T and 3T/2 to 2T) are inverted as shown at center of the figure, resulting in a symmetrical waveform having equal numbers of positive and negative half-cycles and a zero DC output when this waveform is averaged. If the third harmonic is contained in the vibrator output, the one-and-a-half cycle components of all odd-numbered periods are inverted as shown at right of the figure, resulting in an asymmetrical waveform having a greater number of positive half-cycles than negative half-cycles. When this waveform is averaged, two-thirds of its half-cycles are cancelled out each other, but the remaining one-third results in an undesirable DC output. Thus, the harmonics of even-numbered order are cancelled, but those of odd-numbered order produce undesirable DC component.

Figure 2:
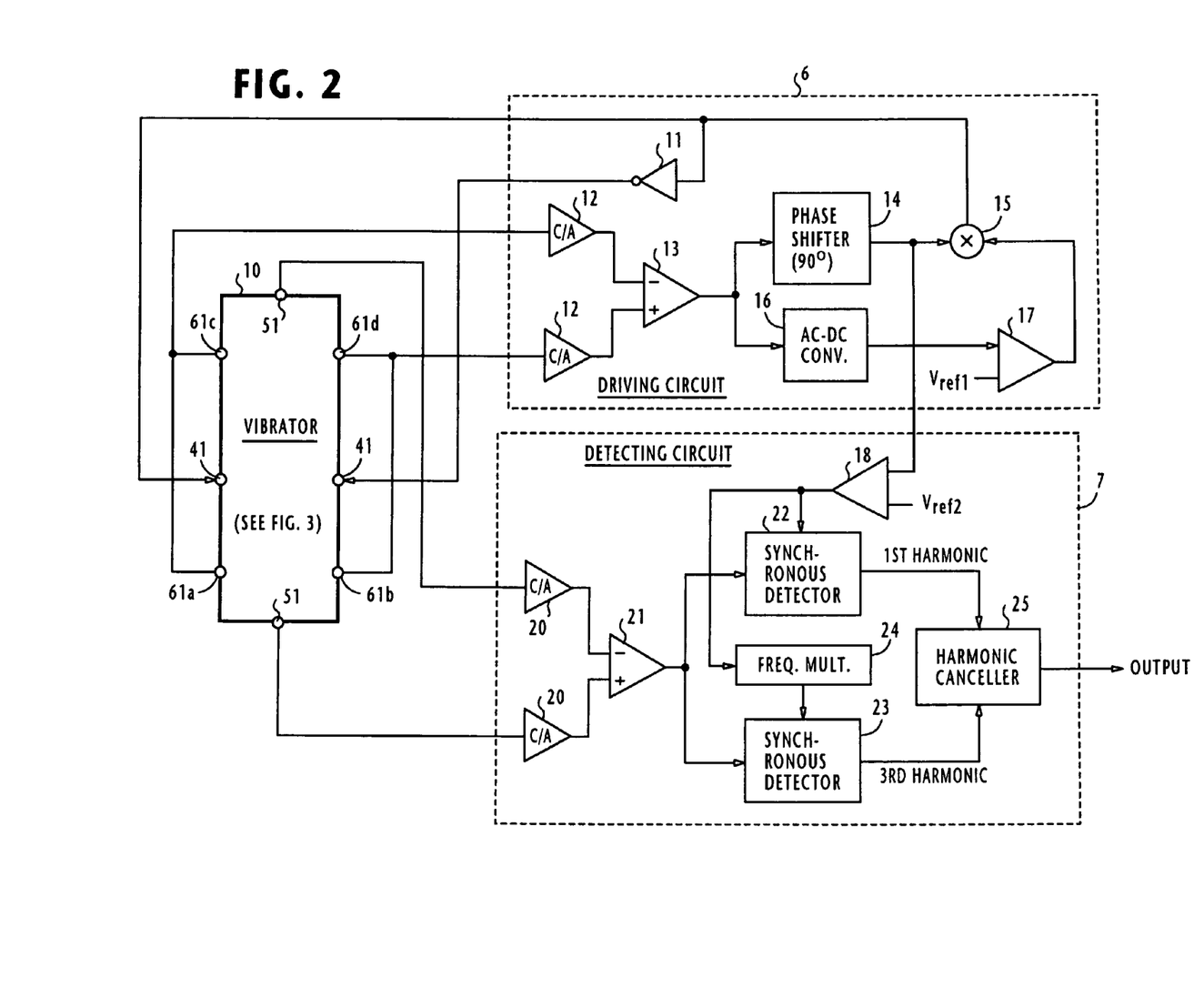
FIG. 2 is a block diagram of a vibratory angular rate sensor according to the present invention.

Referring to FIG. 2, a vibratory angular rate sensor (gyrosensor) 1 according to the present invention is illustrated. The angular rate sensor 1 comprises a vibrator 10 having a pair of driving terminals 41, two pairs of monitoring terminals 61a through 61d, and a pair of detecting terminals 51. A driving circuit 6 is connected to the driving and monitoring terminals 41, 61 of the vibrator 10 to generate mechanical oscillations and a detecting circuit 7 is connected to the detecting terminals 51 to sense a voltage representing the resulting capacitance variations and to cancel the harmonic of the undesirable odd-numbered order contained in the sensed voltage in a manner as will be described later.

Figure 3:
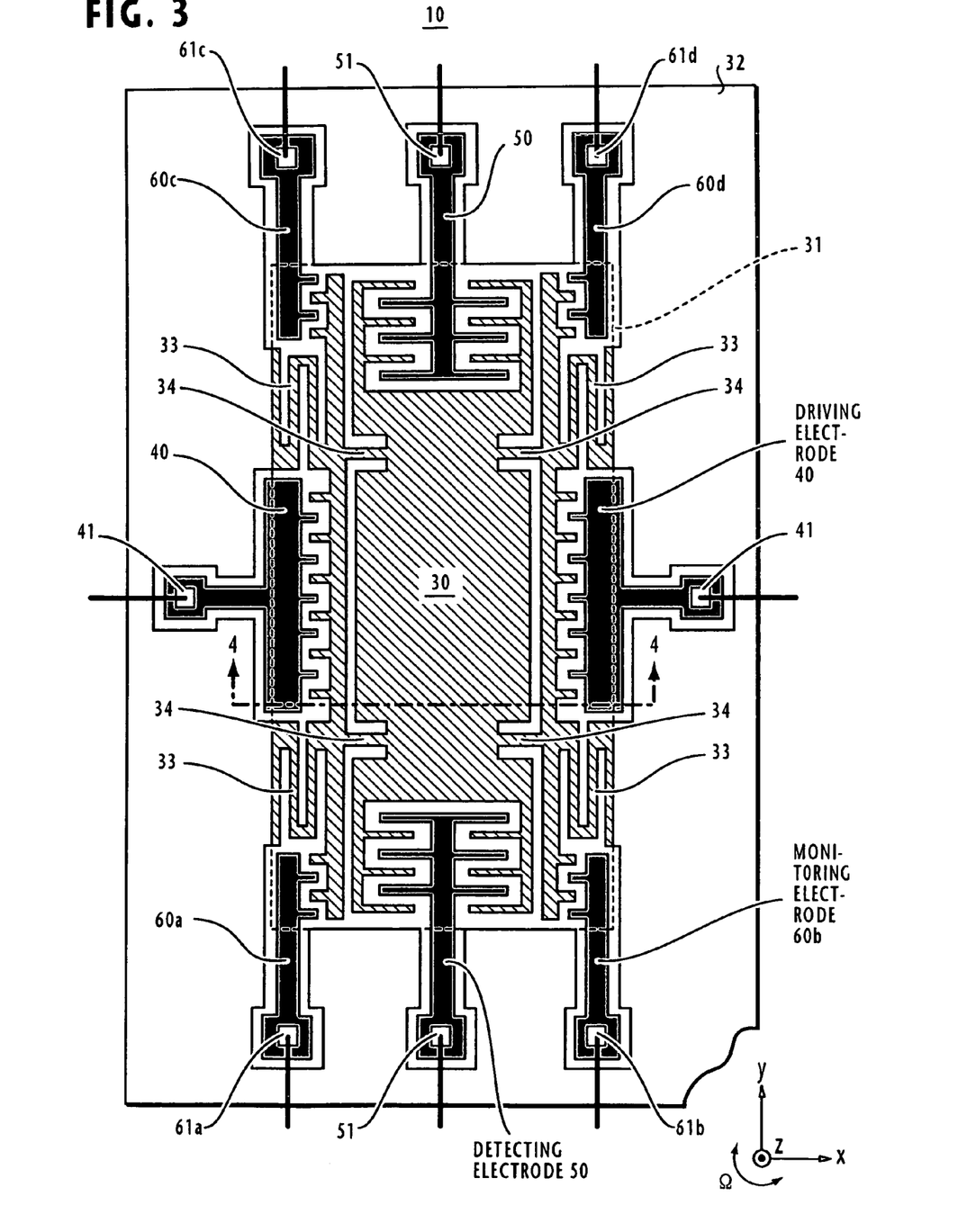
FIG. 3 is a plan view of a vibrator used in the present invention.
Figure 4:
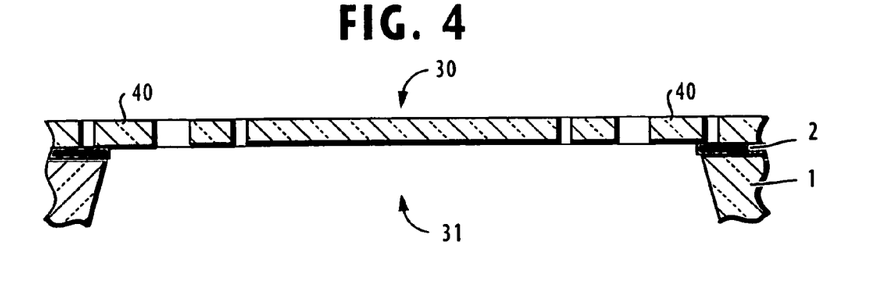
FIG. 4 is a cross-sectional view taken along the line 4—4 of FIG. 3.

Briefly referring to FIGS. 3 and 4, the vibrator 10 is comprised of an SOI (silicon-on-insulator) structure including a base member 1. On the upper side of base member 1, a silicon dioxide film 2 and a silicon substrate 3 are formed, using the conventional semiconductor technology. Grooves are etched in the upper silicon substrate 3 to create a vibrating element 30, a pair of driving electrodes 40, a pair of detecting electrodes 50 and two pairs of monitoring electrodes 60a through 60d. An opening 31 is etched in the base member 1 and the silicon dioxide film 2.

All the electrodes have a comb-like portion, or serrated edge that is interdigitated with a corresponding serrated edge of the vibrating element 30 to establish a capacitive coupling in a manner similar to the known interdigitated capacitor. Specifically, the driving electrodes 40 are located on opposite sides of the vibrating element 30 and one of these electrodes is located between the monitoring electrodes 61a and 61c, the other being located between the monitoring electrodes 61b and 61d. Through the terminals 41, the driving electrodes 40 receive a driving voltage from the driving circuit 6 to cause the vibrating element 30 to oscillate along the x-direction (reference direction). Oscillations of vibrating element along the x-direction are sensed by the monitoring electrodes 60a through 60d and fed back to the driving circuit to control the driving voltage as described later. Detecting electrodes 50 are located on the opposite ends of the vibrating element 30, one of these electrodes being located between the monitoring electrodes 61a and 61b and the other between the monitoring electrodes 61c and 61d.

Vibrating element 30 is formed with four beam portions 33 that are resiliently deformable along the x-direction and four beam portions 34 that are resiliently deformable along the y-direction (detection direction) perpendicular to the x-direction. Beams 34 serve as bridges between the vibrating element 30 and its serrated portions, while the beams 33 serve as bridges between the serrated portions of vibrating element 30 and an outside area 32 that surrounds it.

When the vibrating element 30 is oscillated at a predetermined frequency ($f_d$) along the x-direction with the resilient beams 33, the resultant capacitance variations are sensed by the monitoring electrodes 60 and fed back through the terminals 61 to the driving circuit 6 to control the driving voltage according to the frequency and amplitude of the x-direction oscillation. If the oscillating vibrating element 30 is subjected to an angular rate Ω about the z-direction perpendicular to both x-direction and y-direction, a Coriolis force generates in the vibrating element 30, causing it to oscillate along the y-direction with the resilient beams 34. The resultant capacitance variations are sensed by the detecting electrodes 50 and coupled through the terminals 51 to the detecting circuit 7. Therefore, the quadrature component of two-direction oscillations is detected as a representation of the angular rate.

Returning to FIG. 2, the driving circuit 6 comprises a pair of charge amplifiers 12, one of which is connected to the monitoring electrodes 61a, 61c and the other is connected to the monitoring electrodes 61b, 61d. A difference voltage between the amplified capacitance variations is detected by a differential amplifier 13 and delayed by a 90-degree phase shifter 14. A voltage representing the DC amplitude of the output of differential amplifier 13 is supplied from an AC-DC converter 16 to a differential amplifier 17 where the monitored output from the differential amplifier 13 is compared with a reference voltage $V_{ref1}$. The 90-degree delayed voltage from the phase shifter 14 is then scaled in magnitude by a voltage multiplier 15 with the output of differential amplifier 17. The output of multiplier 15 is coupled to the driving terminals 41, one through a direct path and the other through an inverting amplifier 11. Through the application of the 90-degree phase-shifted, amplitude-controlled oscillation back to the vibrator 10, the driving circuit 6 and vibrator 10 combine to operate as a self-excited oscillation mechanism which sustains the mechanical vibration of element 30 in the neighborhood of its resonant frequency primarily determined by the resiliency of the beams 34. The amplitude of the oscillation is controlled to within a fixed range centered about the reference voltage $V_{ref1}$.

The capacitance variations sensed by the detecting electrodes 50 are coupled through their terminals 51 to charge amplifiers 20 of the detecting circuit 7, where they are amplified into respective voltages. The difference between the voltages is detected by a differential amplifier 21 and supplied to a primary synchronous detector 22 and a harmonic synchronous detector 23. Detecting circuit 7 includes a comparator 18 which compares the output of phase shifter 14 with a reference voltage $V_{ref2}$ to produce clock pulses of square waveform (i.e., 50% duty cycle) at the fundamental frequency $f_d$ when the reference voltage is exceeded.

Primary synchronous detector 22 is clocked with the output of comparator 18 to synchronously detect the oscillation at the fundamental frequency to generate an output voltage that contains a first harmonic and an undesired third harmonic as well. A frequency multiplier 24 of a known PLL (phase-locked loop) configuration is provided to multiply the frequency of the square-wave clock pulses by a factor of 3. Harmonic synchronous detector 23 is clocked with the output of frequency multiplier 24 to synchronously detect the oscillation at thrice the fundamental frequency to generate a replica of the third harmonic. The outputs of synchronous detectors 22 and 23 are coupled to a harmonic canceller 25.

Since the Coriolis force is proportional to the vector product of the vibrator's rate and the applied angular rate, the detected waveform of the vibrator 10 is shifted in phase by 90 degrees with respect to the waveform of the driving voltage. Therefore, the output of the 90-degree phase shifter 14 matches in phase with the angular rate of the Coriolis force, and hence the clock pulse generated by the comparator 18 is most advantageous for the synchronous detector 22 to detect the first harmonic.

Figure 5:
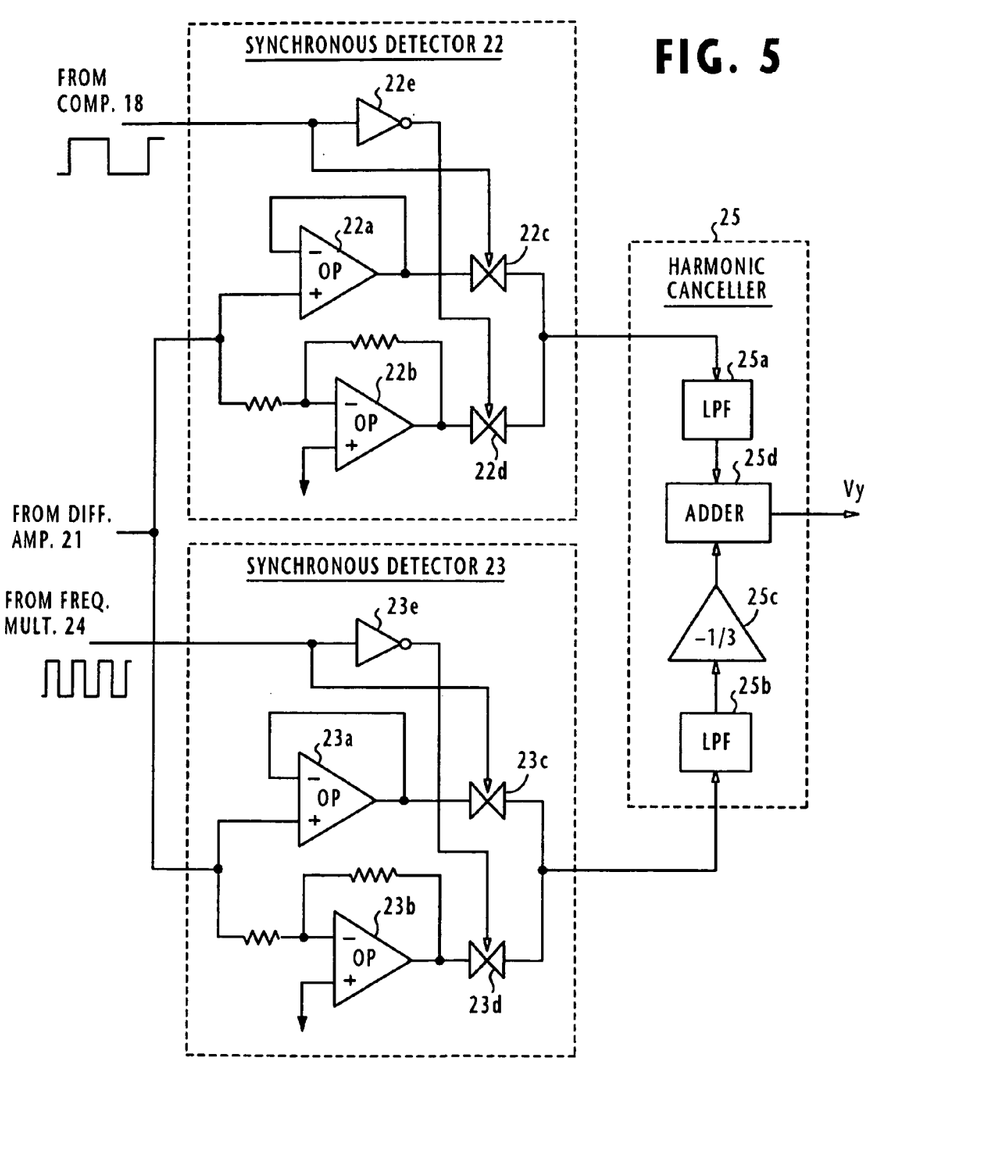
FIG. 5 is a block diagram illustrating details of the synchronous detectors and harmonic canceller of FIG. 2.

Details of the synchronous detectors 22, 23 and one example of the harmonic canceller 25 are shown in FIG. 5. Synchronous detectors 22 and 23 are of identical configuration. Primary synchronous detector 22 is comprised of a pair of operational amplifiers 22a and 22b configured so that the former functions as a unity-gain non-inverting amplifier on the output signal of differential amplifier 21 and the latter functions as a unity-gain inverting amplifier on the same output signal. The outputs of amplifiers 22a and 22b are respectively connected to analog switches 22c and 22d. Analog switch 22c is controlled by the square-wave clock pulse directly supplied from the comparator 18 and the analog switch 22d is controlled by the same but inverted clock pulse supplied from the comparator 18 through an inverter 22e. The outputs of analog switches 22c and 22d are connected together to one input terminal of the harmonic canceller 25.

In the same manner, the synchronous detector 23 is comprised of a pair of operational amplifiers 23a and 23b, with the former functioning as a unity-gain non-inverting amplifier on the output signal of differential amplifier 21 and the latter functioning as a unity-gain inverting amplifier on the same output signal. The outputs of amplifiers 23a and 23b are respectively connected to analog switches 23c and 23d. Analog switch 23c is controlled by the square-wave clock pulse directly supplied from the frequency multiplier 24 and the analog switch 23d is controlled by the same but inverted clock pulse supplied from the frequency multiplier 24 through an inverter 23e. The outputs of analog switches 23c and 23d are connected together to the other input terminal of the harmonic canceller 25.

Harmonic canceller 25 comprises low-pass filters 25a and 25b for filtering the output of synchronous detectors 22 and 23, respectively, to produce averaged DC output voltages. The output voltage of low-pass filter 25b is applied to a scaling circuit 25c that inverts the input voltage in polarity and scales its amplitude down to ⅓ of its input level. The outputs of low-pass filter 25a and the scaling circuit 25c are supplied to an adder 25d. The residual third harmonic component that remains uncancelled in the output of low-pass filter 25a is cancelled by the output of scaling circuit 25c.

At half-cycle intervals of fundamental frequency $f_d$, the outputs of amplifiers 22a and 22b are alternately delivered from the synchronous detector 22 to the low-pass filter 25a. Specifically, during odd-numbered half cycles nT/2<t<(n+1)T/2 (where T=1/$f_d$ and n=0, 2, 4, . . . ), the output of non-inverting amplifier 22a is selected by switch 22c and during even-numbered half cycles nT/2<t<(n+1)T/2 (where n=1, 3, 5, . . . ) the output of inverting amplifier 22b is selected by switch 22d.

As a result, all negative half cycles of the input voltage from the differential amplifier 21 are inverted to the positive side. By passing though the low-pass filter 25a, all positive half cycles of the output of synchronous detector 22 are averaged out to a DC voltage.

If the output voltage $V_{diff}(t)$ of differential amplifier 21 contains only the first harmonic, it is given by:

$$V_{diff}(t) = V_1 \sin(\omega_d t + \theta_1) + V_{dc} \quad (1)$$

where, $V_1$ is the amplitude of the first harmonic, $\omega_d$ the angular frequency of the first harmonic, $\theta_1$ is the phase angle of noise component with respect to the reference clock pulse, and $V_{dc}$ is an undesired DC component.

On the other hand, the output voltage $V_{LPF1}$ of low-pass filter 25a is expressed as:

$$V_{LPF1} = \frac{V_1}{T}\left[\int_0^{T/2} \sin(\omega_d t + \theta_1) dt - \int_{T/2}^T \sin(\omega_d t + \theta_1) dt\right] + \quad (2)$$

$$\frac{1}{T}\left[\int_0^{T/2} V_{dc} dt - \int_{T/2}^T V_{dc} dt\right]$$

$$= \frac{2}{\pi} V_1 \cos\theta_1$$

Figure 6:
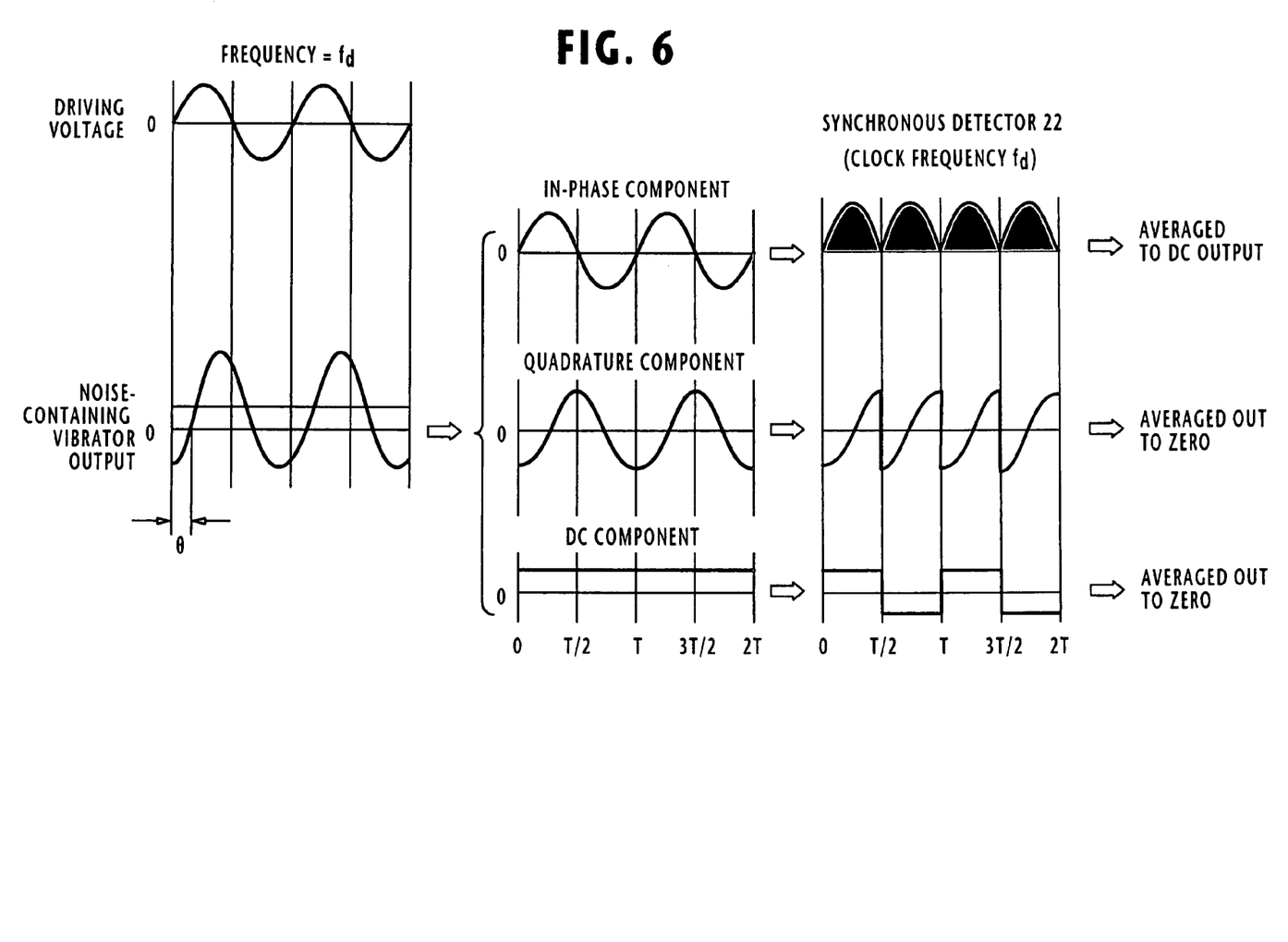
FIG. 6 is an illustration of waveforms resulting from the primary synchronous detector operating on first harmonic.

More specifically, by rewriting Equation (1) as:

$$V_{diff}(t) = V_1 \cos\theta_1 \sin\omega_d t + V_1 \sin\theta_1 \cos\omega_d t + V_{dc} \quad (3)$$

and averaging Equation (3), the first term (in-phase component) of Equation (3) is converted to a useful DC output represented by Equation (2), and the second term (quadrature component) and the third term (DC component) of Equation (3) are cancelled. The averaged waveforms of the first, second and third terms of Equation (3) are depicted in FIG. 6.

If the output voltage $V_{diff}(t)$ of differential amplifier 21 additionally contains second and third harmonics, voltage $V_{diff}(t)$ is given by:

$$V_{diff}(t) = V_1 \sin(\omega_d t + \theta_1) + V_2 \sin(2\omega_d t + \theta_2) + \quad (4)$$

$$V_3 \sin(3\omega_d t + \theta_3) + V_{dc}$$

where, $V_2$ and $V_3$ represent the amplitude of the second and third harmonics and $\theta_2$ and $\theta_3$ are the phase angle of noise components of the second and third harmonics with respect to the reference clock pulse.

By averaging Equation (4), the second and fourth terms are cancelled and the first and third terms result in the following output voltages:

$$V_{LPF1} = \frac{2}{\pi} V_1 \cos\theta_1 + \frac{2}{3\pi} V_3 \cos\theta_3 \quad (5)$$

Figure 7A:
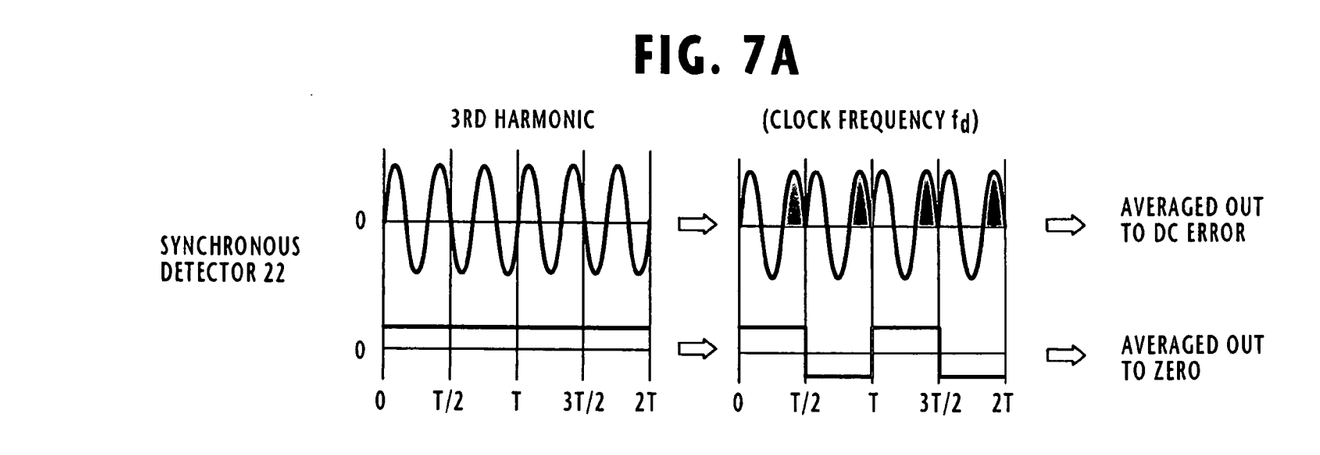
FIG. 7A is an illustration of waveforms resulting from the primary synchronous detector operating on third first harmonic.

It is seen that the second term of Equation (5) represents the undesired DC component of the output of low-pass filter 25a, as shown in FIG. 7A.

On the other hand, the outputs of amplifiers 23a and 23b are alternately delivered from the synchronous detector 23 to the low-pass filter 25b at half-cycle intervals of third harmonic frequency $3f_d$. Specifically, during odd-numbered half cycles nT<t<(n+1/6)T, (n+1/3)T<t<(n+1/2)T and (n+2/3)T<t<(n+5/6)T (where n=0, 1, 2, . . . ), the output of non-inverting amplifier 23a is selected by switch 23c and during even-numbered half cycles (n+1/6)T<t<(n+1/3)T, (n+1/2)T<t<(n+2/3)T and (n+5/6)T<t<(n+1)T (where n=0, 1, 2, . . . ), the output of inverting amplifier 23b is selected by switch 23d. Low-pass filter 25b has the effect of averaging the output of the synchronous detector 23 and producing the following output voltage $V_{LPF2}$:

$$V_{LPF2} = \frac{1}{T}\left[\int_0^{T/6} V_{diff}(t) dt - \int_{T/6}^{T/3} V_{diff}(t) dt + \int_{T/3}^{T/2} V_{diff}(t) dt - \right. \quad (6)$$

$$\left. \int_{T/2}^{2T/3} V_{diff}(t) dt + \int_{2T/3}^{5T/6} V_{diff}(t) dt - \int_{5T/6}^T V_{diff}(t) dt\right]$$

Substituting Equation (4) into Equation (6) gives the following result.

$$V_{LPF2} = \frac{2}{\pi} V_3 \cos\theta_3 \quad (7)$$

Figure 7B:
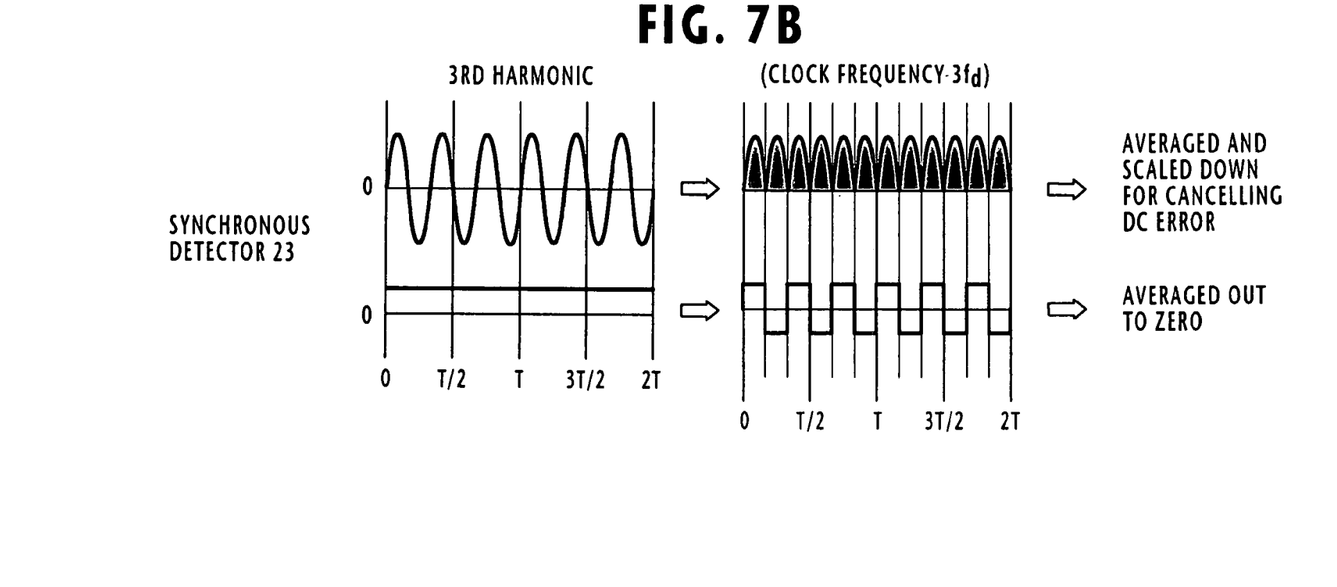
FIG. 7B is an illustration of waveforms resulting from the harmonic synchronous detector operating on third first harmonic.

In this way, the fundamental frequency component and the even-numbered harmonic components are cancelled in the averaging process of the low-pass filter 25b and the odd-numbered (third harmonic) component is detected, as shown in FIG. 7B. Scaling circuit 25c inverts the polarity of this voltage $V_{LPF2}$ and reduces its amplitude by a factor of 3 as described above, thus the following relation holds at the output of adder 25d:

$$V_{OUT} = V_{LPF1} - \frac{1}{3} V_{LPF2} \quad (8)$$

$$= \frac{2}{\pi} V_1 \cos\theta_1$$

Figure 8:
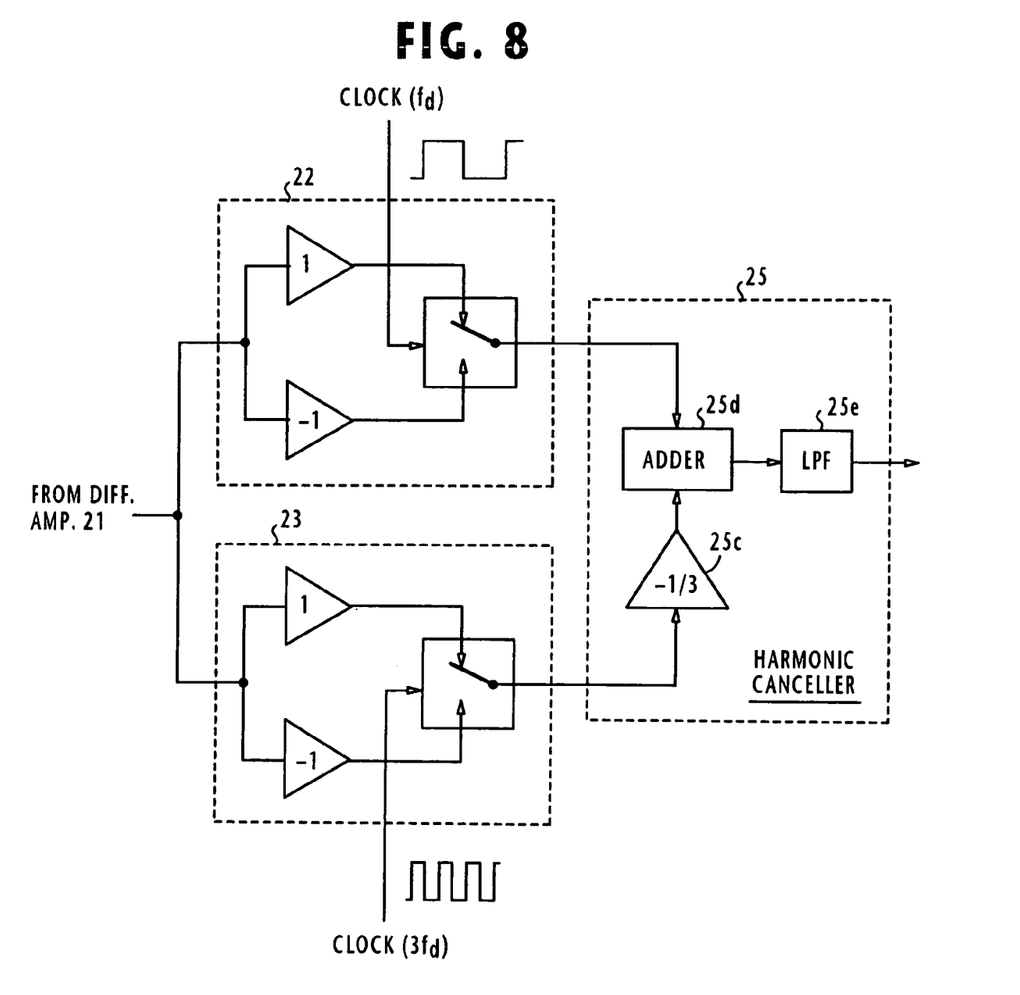
FIG. 8 is a block diagram of the synchronous, detector and harmonic canceller according to a modified embodiment of the present invention.

In an alternative embodiment, since the low-pass filters 25a and 26b can be provided at the output of adder 25d, these low-pass filters can be combined in a single low-pass filter 25e having a cut-off frequency lower than the fundamental frequency $f_d$ and placed at the output of adder 25d, as shown in FIG. 8. In the adder 25d, the output of the scaling circuit 25c is combined with the output of the synchronous detector 22 to cancel the odd-numbered harmonics contained in the output of the primary synchronous detector 22, so that the fundamental (primary) frequency component is detected at the output of adder 25d. The detected primary frequency component is then averaged by the low-pass filter 25.

Figure 9:
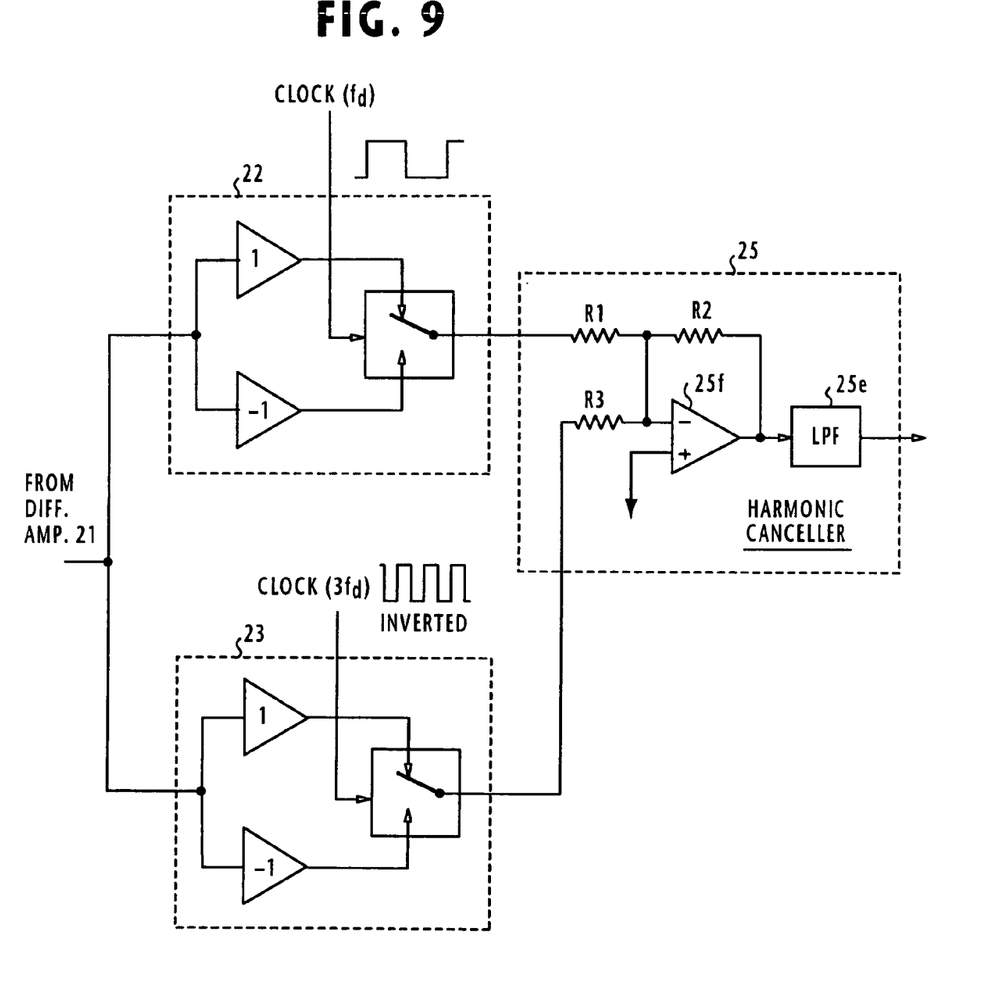
FIG. 9 is a block diagram of the synchronous detector and harmonic canceller according to a further modification of the present invention.

A modified form of the harmonic canceller 25 is shown in FIG. 9 in which the clock pulses of the third harmonic frequency are inverted with respect to the clock pulses of the fundamental frequency. Thus, the analog switches 23c and 23d of synchronous detector 23 of FIG. 9 are operated inversely to those of FIGS. 5 and 8. During odd-numbered half cycles nT<t<(n+1/6)T, (n+1/3)T<t<(n+1/2)T and (n+2/3)T<t<(n+5/6)T (where n=0, 1, 2, . . . ), the output of inverting amplifier 23b is selected by switch 23d and during even-numbered half cycles (n+1/6)T<t<(n+1/3)T, (n+1/2)T<t<(n+2/3)T and (n+5/6)T<t<(n+1)T (where n=0, 1, 2, . . . ), the output of non-inverting amplifier 23a is selected by switch 23c. An operational amplifier 25f is provided as an adder with a resistor network including resistors R1, R2 and R3. Resistors R1 and R3 are the gain determining resistors that are respectively connected from the outputs of synchronous detectors 22 and 23 to the inverting input of operational amplifier 25f. Resistor R2 is a negative feedback resistor connected between the output of the amplifier 25f and its inverting input. Low-pass filter 25e is connected to the output of the adder 25f. By setting the value of resistor R3 three times higher than the value of resistor R1, the positive output of synchronous detector 22 is combined with the negative output of synchronous detector 23 with a ratio of 3:1.

Figure 10:
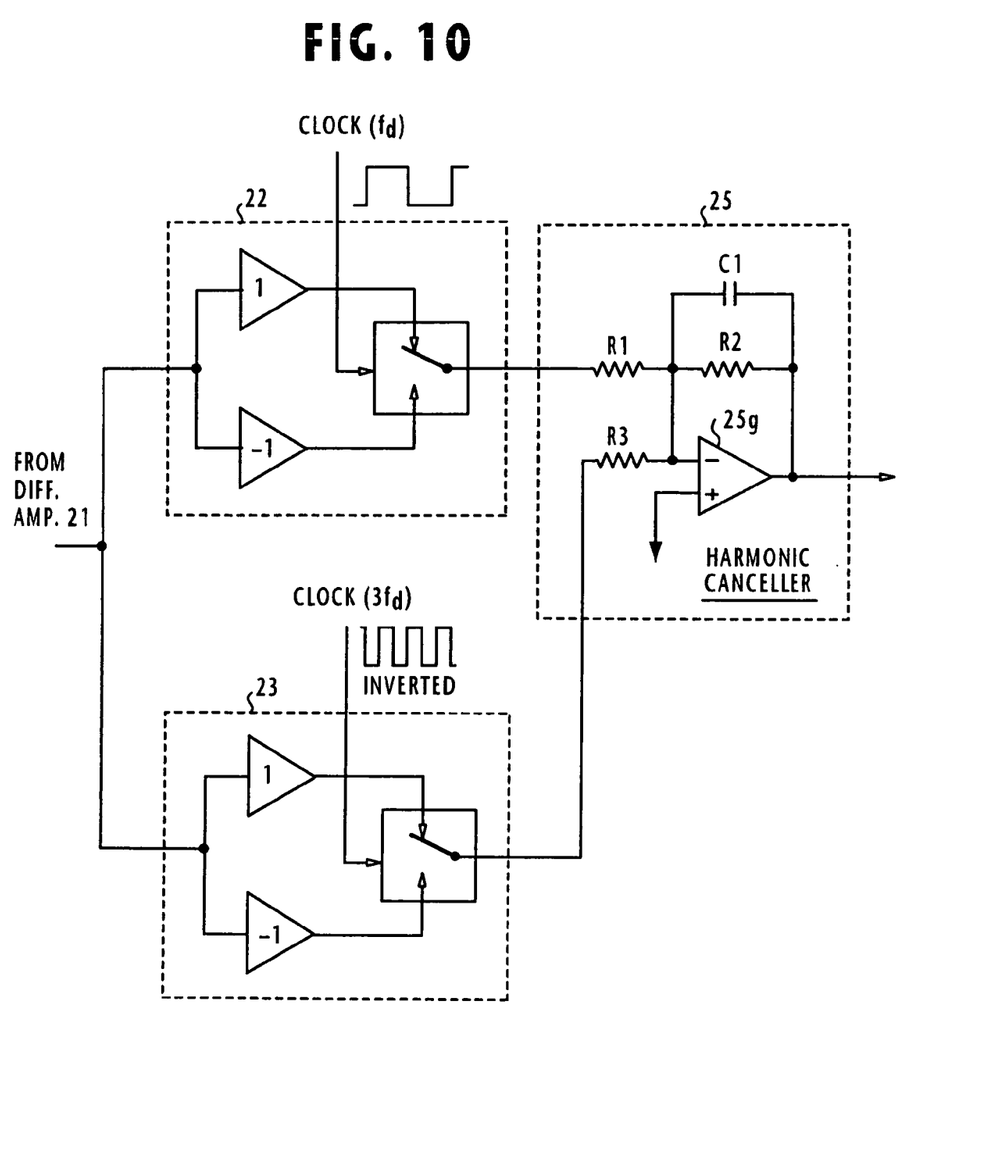
FIG. 10 is a block diagram of the synchronous detector and harmonic canceller according to a still further modification of the present invention.

Harmonic canceller of FIG. 9 is modified as shown in FIG. 10. In this modification, the low-pass filter 25e of FIG. 9 is removed by configuring the operational amplifier 25f as an active filter 25g using a feedback capacitor C1 connected in parallel with the feedback resistor R2. Feedback resistor R2 and feedback capacitor C1 are chosen so that the following relation holds:

$$f_c = 1/(2\pi R2 \times C1) \tag{9}$$

where $f_c$ is the cut-off frequency of a first-order low-pass filter lower than the fundamental frequency $f_d$.

Figure 11:
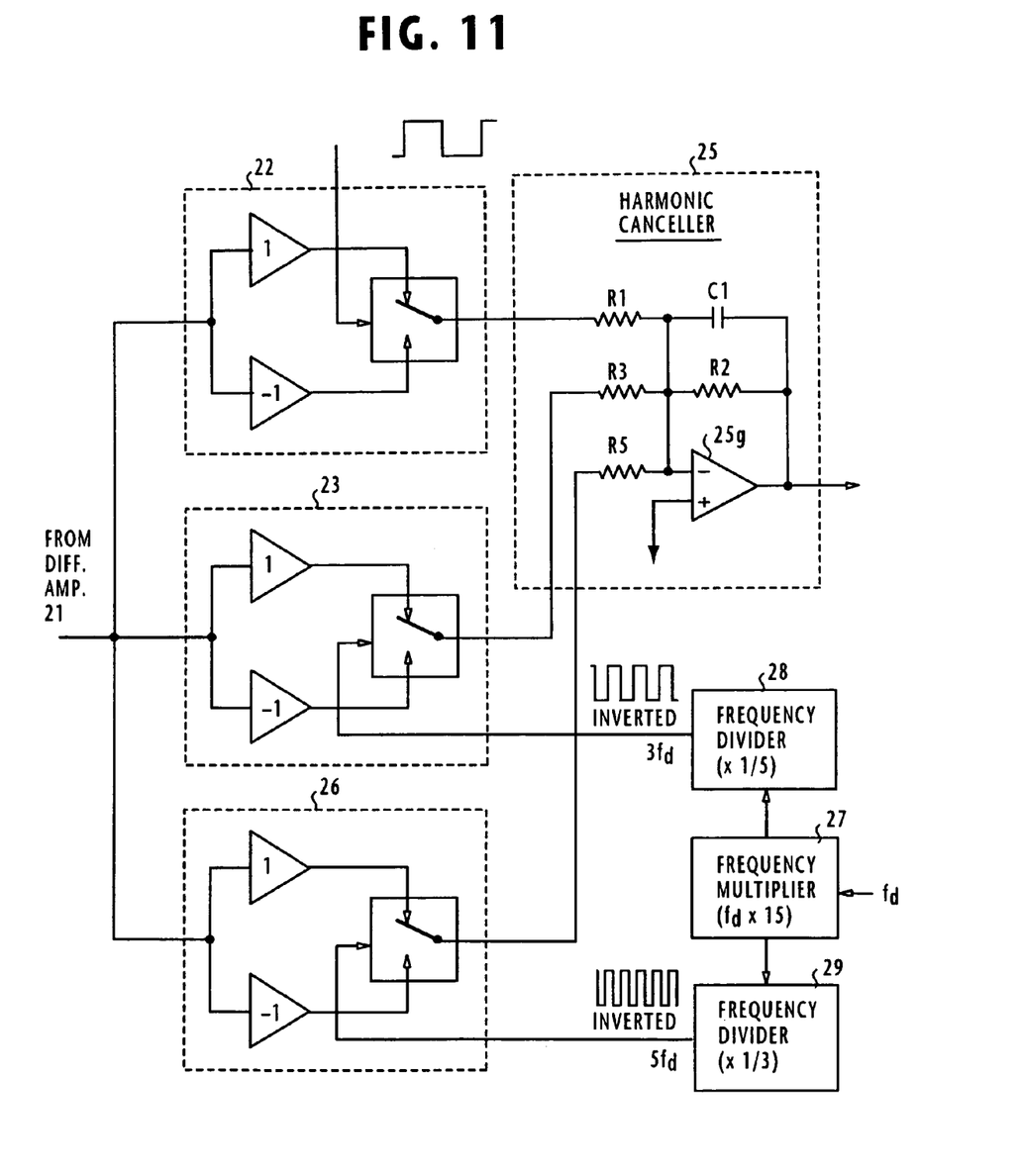
FIG. 11 is a block diagram of the synchronous detector and harmonic canceller for cancelling third and fifth harmonic components.

FIG. 11 shows another embodiment of the present invention in which more than one odd-numbered harmonic is cancelled. In this embodiment, a synchronous detector 26 is additionally provided for detecting a fifth harmonic component contained in the vibrator output. For operating the synchronous detectors 23 and 26 at third and fifth harmonic frequencies respectively, a frequency multiplier 27 and two frequency dividers 28 and 29 are provided. Frequency multiplier 27 multiplies the fundamental frequency $f_d$ by a factor of 15 (or the least common multiple of 3 and 5). Frequency divider 28 divides the output frequency of the multiplier 27 by a factor of 5 and the frequency divider 29 divides the output frequency of the multiplier 27 by a factor of 3. Frequency divider 28 supplies inverted clock pulses of the third harmonic frequency to the synchronous detector 23 and the frequency divider 29 supplies inverted clock pulses of the fifth harmonic frequency to the synchronous detector 26. As described previously, these clock pulses are inverted in polarity with respect to the odd-numbered harmonics contained in the output of primary synchronous detector 22 so that the canceling voltages are negative with respect to the cancelled voltages.

Harmonic canceller 25 is identical to that of FIG. 10 additionally includes a resistor R5 connected to the inverting input terminal of the operational amplifier 25g operating as an active filter. Resistor R3 has three times greater resistance than resistor R1 and resistor R5 has five times greater resistance than R1. The outputs of synchronous detectors 22, 23 and 26 are negatively combined in the operational amplifier 25g at a ratio 5:3:1.

In the previous embodiment of FIG. 5, for example, if ninth harmonic component $V_9 \sin(9\omega_d t + \theta_9)$ is contained in the vibrator output, the low-pass filter 25a will produce the following output voltage:

$$V_{LPF1} = \frac{2}{\pi} V_1 \cos\theta_1 + \frac{2}{3\pi} V_3 \cos\theta_3 + \frac{2}{9\pi} V_9 \cos\theta_9 \tag{10}$$

Since the harmonic synchronous detector 23 is clocked at the third harmonic frequency, rather than at the ninth harmonic frequency, one-third of the half-wave components of the ninth harmonic will remain uncancelled, instead of one-ninth of these half-wave components, the low-pass filter 25b will produce the following output voltage:

$$V_{LPF2} = \frac{2}{\pi} V_3 \cos\theta_3 + \frac{2}{3\pi} V_9 \cos\theta_9 \tag{11}$$

It is seen that by applying this low-pass filter output to the scaling circuit 25c where the filter output is reduced by a factor 3, the undesired second and third terms of Equation (10) are cancelled when they are combined in the adder.

The odd-numbered harmonics that are of primary concern for designing a gyrosensor include third, fifth, seventh and ninth. Since the use of third harmonic synchronous detector 23 enables not only third harmonic but also ninth harmonic to be cancelled, it is suffice to consider third, fifth and seventh harmonics, i.e., the prime-numbered harmonics. In most cases, the third harmonic synchronous detector 23 is sufficient for practical purposes.

What is claimed is:

1. A vibratory angular rate sensor comprising:
    a vibrator having a vibrating element arranged to oscillate along a first direction, said element being arranged to further oscillate along a second direction perpendicular to the first direction when subjected to angular rate about a third direction perpendicular to said first and second directions;
    a driving circuit for causing said vibrator to oscillate said vibrating element at a predetermined frequency along said first direction;
    an oscillation detector for detecting oscillations of said vibrating element along said second direction and generating a voltage representative of the detected oscillations;
    a first synchronous detector for synchronously detecting a primary frequency component of said generated voltage using clock pulses of said predetermined frequency and producing an output signal containing the detected primary frequency component;
    a second synchronous detector for synchronously detecting an odd-numbered harmonic of said generated voltage using clock pulses of the frequency of the odd-numbered harmonic; and
    a harmonic canceller for canceling a residual odd-numbered harmonic component contained in said output signal of said first synchronous detector with the odd-numbered harmonic detected by said second synchronous detector.

2. The vibratory angular rate sensor of claim 1, wherein said harmonic canceller reduces the odd-numbered harmonic detected by the second synchronous detector in amplitude by a factor corresponding to the order of the odd-numbered harmonic and destructively combines the reduced odd-numbered harmonic with said residual odd-numbered harmonic component.

3. The vibratory angular rate sensor of claim 1, further comprising:
    a clock pulse generator for generating said clock pulses of said predetermined frequency; and
    a frequency multiplier for generating said clock pulses of said odd-numbered harmonic frequency by multiplying said predetermined frequency by a factor corresponding to said odd-numbered harmonic.

4. The vibratory angular rate sensor of claim 3, wherein said second synchronous detector synchronously detects said odd-numbered harmonic using clock pulses of waveform inverted with respect to the clock pulses of said predetermined frequency, and wherein said harmonic canceller includes an adder for summing the odd-numbered harmonic detected by said second synchronous detector with said output signal of said first synchronous detector.

5. The vibratory angular rate sensor of claim 4, wherein said harmonic canceller comprises a low-pass filter having a cut-off frequency lower than said predetermined frequency, said low-pass filter being configured to operate as an active filter and said adder.

6. The vibratory angular rate sensor of claim 1, wherein said second synchronous detector synchronously detects odd-numbered harmonic whose order is equal to or lower than ninth.

7. The vibratory angular rate sensor of claim 3, wherein said second synchronous detector synchronously detects odd-numbered harmonic whose order is equal to or lower than ninth.

8. The vibratory angular rate sensor of claim 6, wherein said second synchronous detector synchronously detects odd-numbered harmonic of said generated voltage using clock pulses of the frequency of the third harmonic.

9. The vibratory angular rate sensor of claim 7, wherein said second synchronous detector synchronously detects said odd-numbered harmonic of said generated voltage using clock pulses of the frequency of the third harmonic.

10. The vibratory angular rate sensor of claim 1, wherein a plurality of said second synchronous detector are provided respectively for synchronously detecting odd-numbered harmonics of different orders from said generated voltage using clock pulses of the odd-numbered harmonic frequencies of the different orders.

11. The vibratory angular rate sensor of claim 3, wherein a plurality of said second synchronous detector are provided respectively for synchronously detecting odd-numbered harmonics of different orders from said generated voltage using clock pulses of the odd-numbered harmonic frequencies of the different orders.

12. The vibratory angular rate sensor of claim 10, further comprising a frequency multiplier for multiplying said predetermined frequency by a common multiple of said odd-numbered harmonic frequencies of the different orders and a plurality of frequency dividers for dividing the multiplied predetermined frequency by a plurality of factors respectively corresponding to the orders of said odd-numbered harmonics.

13. The vibratory angular rate sensor of claim 11, further comprising a frequency multiplier for multiplying said predetermined frequency by a common multiple of said odd-numbered harmonic frequencies of the different orders and a plurality of frequency dividers for dividing the multiplied predetermined frequency by a plurality of factors respectively corresponding to the orders of said odd-numbered harmonics.

14. The vibratory angular rate sensor of claim 4, wherein said adder comprises:
an operational amplifier;
a first gain determining resistor for coupling said output signal of said first synchronous detector to said operational amplifier; and
a second gain determining resistor for coupling the odd-numbered harmonic detected by said second synchronous detector to said operational amplifier, said first and second gain determining resistors having a resistance ratio of N:1, where N is the order of said odd-numbered harmonic.

15. The vibratory angular rate sensor of claim 1, wherein said harmonic canceller reduces a DC voltage representing the detected odd-numbered harmonic by a factor corresponding to the order of the odd-numbered harmonic and destructively combines the reduced DC voltage with a DC voltage representing said output signal of said first synchronous detector.

16. The vibratory angular rate sensor of claim 1, wherein said harmonic canceller comprises:
a first filter circuit for averaging the output signal of said first synchronous detector;
a second filter circuit for averaging the odd-numbered harmonic detected by the second synchronous detector;
a scaling circuit for reducing a voltage output from said second filter circuit by a factor corresponding to the order of said odd-numbered harmonic; and
an adder for destructively summing a voltage output from said first filter with the reduced voltage output from said scaling circuit.

17. The vibratory angular rate sensor of claim 3, wherein said harmonic canceller comprises:
a scaling circuit for reducing the detected odd-numbered harmonic in amplitude by a factor corresponding to the order of said odd-numbered harmonic;
an adder for destructively summing the reduced odd-numbered harmonic with said output signal of said first synchronous detector; and
a low-pass filter for averaging an output signal of said adder.

18. The vibratory angular rate sensor of claim 1, wherein said vibrator comprises:
a pair of first electrodes having serrated edges interdigitated with serrated portions of said vibrating element for imparting oscillation to said vibrating element along said first direction;
a pair of second electrodes having serrated edges interdigitated with serrated portions of said vibrating element for detecting oscillation of said vibrating element along said first direction; and
a pair of third electrodes having serrated edges interdigitated with serrated portions of said vibrating element for detecting oscillation of said vibrating element along said second direction,
wherein said driving circuit comprises:
a differential amplifier connected to said second electrodes;
a 90-degree phase shifter for introducing a 90-degree phase shift to a voltage output from said differential amplifier;
means for converting an oscillating voltage output from said differential amplifier into a DC voltage;
a differential amplifier for producing a voltage difference between the DC voltage and a reference voltage; and
a multiplier for multiplying a voltage output from said phase shifter by said voltage difference to produce a driving voltage and exciting said first electrodes with the driving voltage,
wherein said oscillation detector comprises a differential amplifier connected to said third electrodes, and said clock pulse generator is connected the output of said 90-degree phase shifter,
wherein said frequency multiplier derives the clock pulses of said odd-numbered harmonic frequency from the clock pulses generated by said clock pulse generator.

19. A method of detecting angular rate, comprising the steps of:
   a) oscillating a vibrating element along a first direction at a predetermined frequency, and allowing said vibrating element to oscillate along a second direction perpendicular to the first direction when the vibrating element is subjected to angular rate about a third direction perpendicular to said first and second directions;
   b) generating a voltage representative of oscillations of said vibrating element along said second direction;
   c) synchronously detecting a primary frequency component of said generated voltage using clock pulses of said predetermined frequency and producing an output signal containing the detected primary frequency component;
   d) synchronously detecting an odd-numbered harmonic of said generated voltage using clock pulses of the frequency of the odd-numbered harmonic; and
   e) canceling a residual odd-numbered harmonic component contained in said output signal of said first synchronous detector with the odd-numbered harmonic detected by said second synchronous detector.

20. The method of claim 19, wherein step (e) comprises the steps of reducing the detected odd-numbered harmonic in amplitude by a factor corresponding to the order of the odd-numbered harmonic and destructively combining the reduced odd-numbered harmonic with said residual odd-numbered harmonic component.

21. The method of claim 19, further comprising the step of generating said clock pulses of said odd-numbered harmonic by multiplying said predetermined frequency by a factor corresponding to the order of said odd-numbered harmonic.

22. The method of claim 21, wherein step (d) comprises the steps of using clock pulses of waveform inverted with respect to the clock pulses of said predetermined frequency, and wherein step (e) comprises the steps of summing the detected odd-numbered harmonic with said output signal produced by step (c).

23. The method of claim 19, wherein the order of said detected odd-numbered harmonic is equal to or lower than ninth.

24. The method of claim 19, wherein step (d) comprises the step of using clock pulses of the frequency of third harmonic.

25. The method of claim 19, wherein step (d) comprises the steps of synchronously detecting a plurality of odd-numbered harmonics of different orders from said generated voltage using clock pulses of the odd-numbered harmonic frequencies of the different orders.

26. The method of claim 25, further comprising the steps of multiplying said predetermined frequency by a common multiple of said odd-numbered harmonic frequencies of the different orders and a plurality of frequency dividers for dividing the multiplied predetermined frequency by a plurality of factors respectively corresponding to the orders of said odd-numbered harmonics.

27. The method of claim 19, wherein step (e) comprises the steps of reducing a DC voltage representing the detected odd-numbered harmonic by a factor corresponding to the order of the odd-numbered harmonic and destructively combines the reduced DC voltage with a DC voltage representing said output signal of said first synchronous detector.

28. The method of claim 19, wherein step (e) comprises the steps of averaging the output signal containing said primary frequency component to produce a first averaged voltage, averaging the detected odd-numbered harmonic to produce a second averaged voltage, reducing the second averaged voltage by a factor corresponding to the order of said odd-numbered harmonic, and destructively summing the first averaged voltage with the reduced averaged voltage.

29. The method of claim 21, wherein step (e) comprises the steps of reducing the detected odd-numbered harmonic in amplitude by a factor corresponding to the order of said odd-numbered harmonic, destructively summing the reduced odd-numbered harmonic with said output signal containing said primary frequency component to detect said primary frequency component, and averaging the detected primary frequency component.

30. The method of claim 19, wherein step (a) comprises the steps of:
   generating a voltage representative of oscillations of said vibrating element along said first direction;
   introducing a 90-degree phase shift to the generated voltage; and
   producing a driving voltage from the phase-shifted voltage to oscillate said vibrating element along said first direction and oscillating said vibrating element with the driving voltage.

31. The method of claim 30, further comprising the steps of:
   converting the voltage generated by step (b) into a DC voltage;
   producing a voltage difference between the DC voltage and a reference voltage; and
   multiplying the phase-shifted voltage by said voltage difference to produce said driving voltage.

* * * * *